United States Patent [19]

Nelson

[11] Patent Number: 5,463,520
[45] Date of Patent: Oct. 31, 1995

[54] ELECTROSTATIC DISCHARGE PROTECTION WITH HYSTERESIS TRIGGER CIRCUIT

[75] Inventor: Dale H. Nelson, Shillington, Pa.

[73] Assignee: AT&T IPM Corp., Coral Gables, Fla.

[21] Appl. No.: 239,632

[22] Filed: May 9, 1994

[51] Int. Cl.⁶ ................................................. H02H 9/06
[52] U.S. Cl. ............................................. 361/56; 361/91
[58] Field of Search ..................... 361/56, 91, 111, 361/58

[56] References Cited

U.S. PATENT DOCUMENTS

| | | | |
|---|---|---|---|
| 4,855,620 | 8/1989 | Duvvury et al. | 307/448 |
| 5,208,719 | 5/1993 | Wei | 361/56 |
| 5,304,839 | 4/1994 | Chen et al. | 257/546 |
| 5,335,132 | 8/1994 | DeShazo, Jr. | 361/56 |

OTHER PUBLICATIONS

30th Annual Proceedings Reliability Physics 1992, San Diego, Calif., Mar. 31, Apr. 1,2, 1992 "Dynamic Gate Coupling of NMOS For Efficient Output ESD Protection", Charvaka Duvvury et al, pp. 141–150.

Application Ser. #07/894405, Filing Date, Jun. 5, 1992, Allowed Mar. 31, 1994 (Juergen Pianka, Case 1).

Primary Examiner—Todd Deboer
Attorney, Agent, or Firm—James H. Fox

[57] ABSTRACT

An integrated circuit obtains improved ESD protection by way of a shunt protection circuit having a trigger level that exhibits a hysteresis effect with respect to voltage applied to the bondpads. The hysteresis is obtained by a string of voltage dropping transistors that produce a trigger voltage level at an intermediate node, and a shorting transistor that effectively removes at least one transistor from the string. In a typical case, a PNP bipolar transistor serves as the protective device in the circuit to carry the ESD current from the bondpads. An illustrative embodiment with p-channel voltage dropping transistors and an n-channel shorting transistor is shown, along with additional capacitive boost circuitry for speeding up circuit operation. In this manner, a high peak ESD current can be carried while ensuring non-conduction of the protection circuit for normal operating voltages, and also for voltages slightly in excess of normal power supply voltages.

12 Claims, 2 Drawing Sheets

_5,463,520_

ELECTROSTATIC DISCHARGE PROTECTION WITH HYSTERESIS TRIGGER CIRCUIT

BACKGROUND OF THE INVENTION

1. Field of the Invention

The present invention relates to an integrated circuit having an electrostatic discharge protection device that is triggered by a circuit that provides hysteresis.

2. Description of the Prior Art

The protection of integrated circuits (ICs) from electrostatic discharge (ESD) has received considerable design attention, especially as circuit geometries advance to smaller (i.e., sub-micron) dimensions. There are various techniques for protecting input, output, and power supply bondpads on the ICs from ESD damage, which damage may occur during manufacture of the IC chip, or more frequently after the chip is packaged. In the latter case, the ESD voltages are transmitted to the chip bondpads via package terminals, which may be subjected to the ESD voltages during handling, shipment, or subsequent use, for example. One form of ESD protection utilizes voltage clamping diodes to protect the IC circuitry connected to the bondpads, while another technique uses input or output resistors to reduce the ESD voltages transmitted to the IC from the bondpads. In still another form of ESD protection, a transistor is used to clamp the operating voltage on a bondpad to a safe level. It is also known to use a four-layer device (e.g. a thyristor) to introduce hysteresis into the protective circuitry. In that manner, a slightly excessive power supply voltage may be present, as for testing purposes, without triggering the protective circuitry. However, in many IC fabrication processes, a four-layer device is not readily implemented.

One form of transistor protection circuitry is shown in FIG. 1, wherein the protection circuit 10 clamps the voltage between the $V_{DD}$ conductor 12 and the $V_{SS}$ conductor 13 to a safe level when potentially damaging ESD voltage levels are present between $V_{DD}$ power supply bondpad 11 and $V_{SS}$ power supply bondpad 14. For this purpose, the protection circuit 10 comprises a voltage clamping PNP transistor 15 having its emitter and collector connected to the $V_{DD}$ and $V_{SS}$ power supply conductors, respectively. The base of transistor 15 is connected to a trigger circuit comprising resistors 16 and 17, and control transistor 18. The gate of the n-channel control transistor 18 is in turn connected to a voltage divider comprising a stack of p-channel transistors 19–25 and a resistor 26. In normal operation, the voltage drop across each of the transistors 19–27 is about 1 volt, and so the voltage at divider node 27 remains below 1 volt when normal power supply voltages (e.g., $V_{DD}$=5 volts and $V_{SS}$=0 volts) are present. Therefore, the voltage on the gate of transistor 18 is below the conduction threshold, being about 1 volt for an IC implemented in a typical CMOS (complementary metal oxide silicon) technology. This non-conduction of control transistor 18 causes control node 28 to remain at a high voltage level, approximately $V_{DD}$, so that the base of protection transistor 15 is biased to a non-conducting state. Therefore, no significant current conduction occurs through the protection transistor 15 in normal operation.

However, when excessively high voltages (as may be due to ESD) are present between the power supply conductors 12 and 13, the voltage at divider node 27 increases beyond the threshold of control transistor 18, allowing it to conduct. This conduction pulls the control node 28 low, so that the voltage on the base of transistor 15 is biased so as to allow transistor 15 to conduct. Therefore, a significant current flow through transistor 15 helps to dissipate the ESD electrical charge, preventing an excessive voltage from appearing between the power supply conductors 12 and 13. This voltage-clamping action protects other circuitry (not shown) that is coupled either directly or indirectly to the power supply conductors 12 and 13. The clamping voltage at which the circuitry 10 conducts is determined to a significant degree by the number of the voltage-divider transistors, being 7 in the illustrative case (e.g., transistors 19–25). A larger number allows for conduction at a higher voltage; for example, an additional voltage-divider transistor (for a total of 8) has been used to allow for testing of an integrated circuit at higher than normal power supply voltages (e.g., $V_{DD}$=7 volts) without triggering the protective circuit 10. The size and length-to-width ratio of the voltage-divider transistors, as well as their construction, also influences the voltage drop across each transistor, and hence the clamping voltage of the circuitry 10.

A problem has remained however in obtaining a protection circuit that provides a high degree of protection during an ESD event, while still preventing triggering of the protection circuit at slightly higher than normal voltages on the bondpads that are connected to the protection circuitry. Such higher than normal voltages may occur, for example, during testing of the integrated circuit; e.g., testing at 7 volts for an integrated circuit designed for nominal 5 volt operation. In still another case, it is desired to interface integrated circuits operating at 3 volts with external circuitry operating at higher levels (e.g., 5 volts). In that case, it is necessary to avoid triggering any ESD protection circuitry connected to the input bondpads of the 3 volt IC from the 5 volt high logic levels.

SUMMARY OF THE INVENTION

I have invented an integrated circuit having an improved ESD protection circuit that provides a hysteresis effect on current flow through the protection circuit with respect to voltage applied to the protected conductors. The hysteresis is obtained by a string of voltage dropping devices that provides a trigger voltage level for a protective transistor, and a shorting transistor that effectively removes at lease one of the voltage dropping devices from the string, thereby reducing the trigger voltage level.

DETAILED DESCRIPTION

Figure 1:
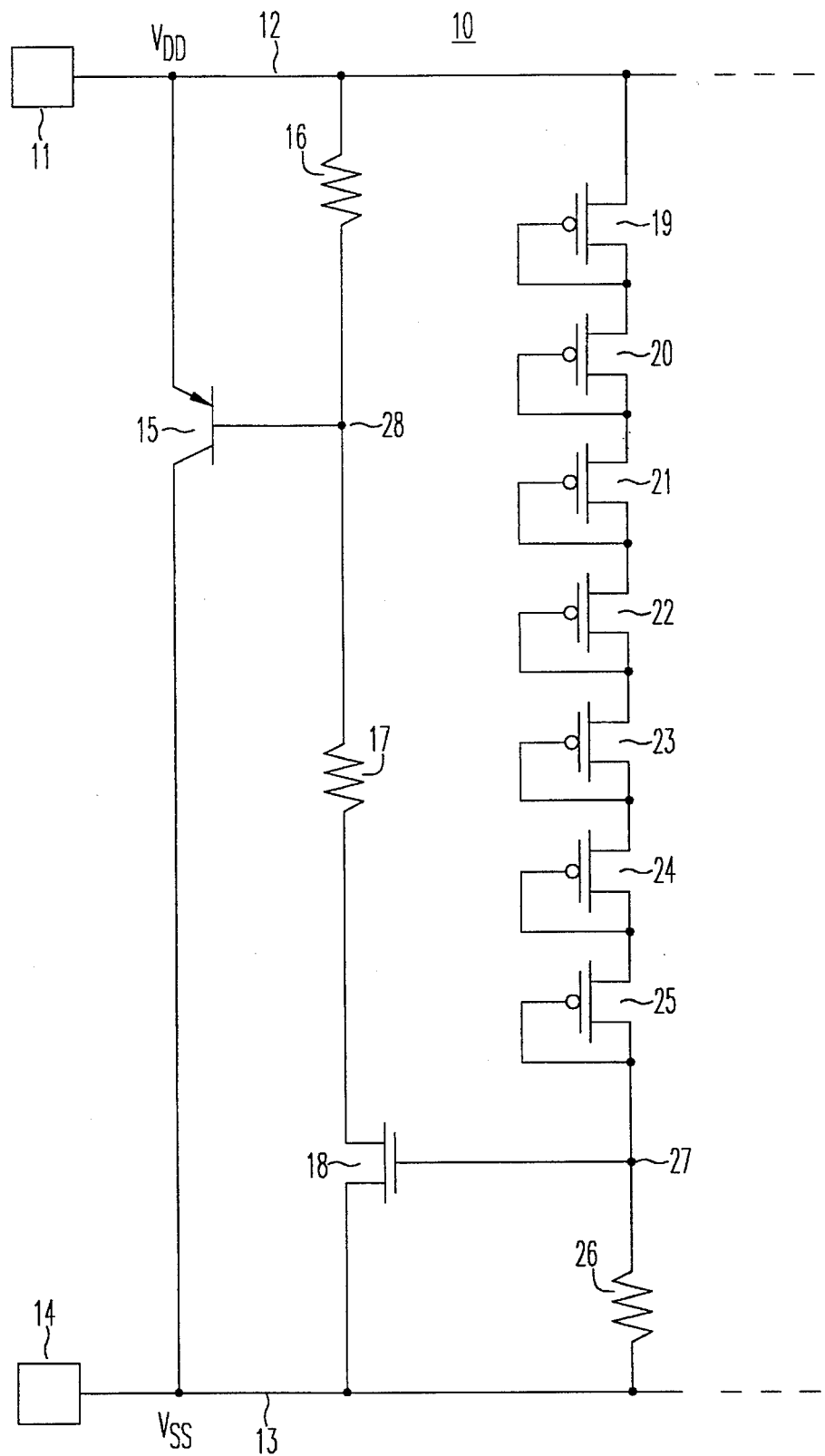
FIG. 1 shows a prior art ESD protection technique.
Figure 2:
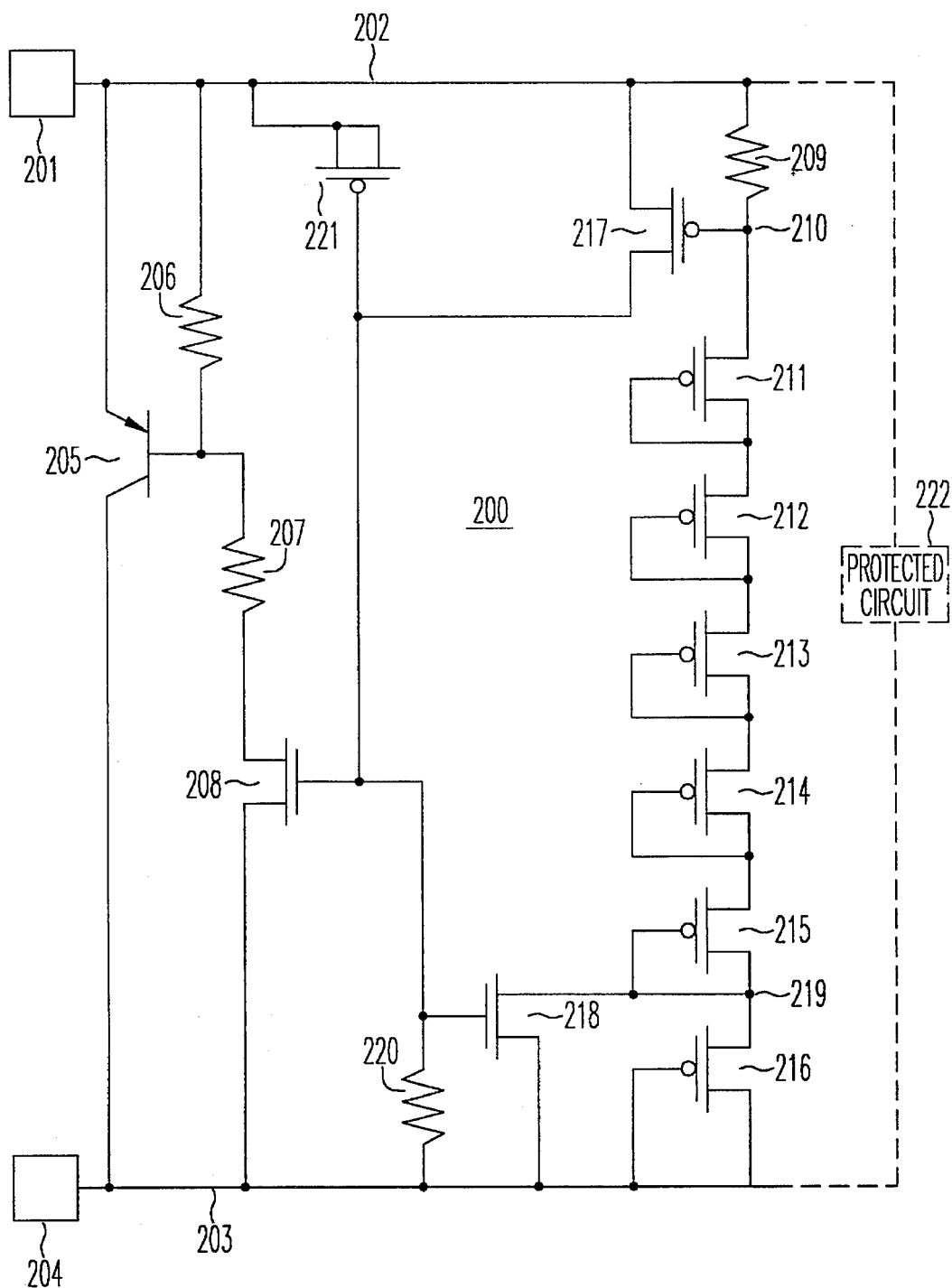
FIG. 2 shows one embodiment of the inventive technique.

The following detailed description relates to an integrated circuit ESD protection technique. Referring to FIG. 2, an ESD shunt protection circuit 200 is illustrated that embodies the inventive technique, but with various other embodiments being possible. The potentially damaging ESD voltage appears across power supply conductors 202 and 203, typically by conduction to the bondpads 201 and 204 from external package terminals (not shown) connected thereto. The protective PNP transistor 205 serves to conduct the ESD current from power supply conductor 202 to power supply conductor 203 when the ESD voltage exceeds a desired level. If desired, this bipolar transistor may be fabricated in a twin-tub CMOS process as described in U.S. Pat. No. 5,304,839 coassigned herewith. The bias resistor 206 (typically about 5 kilohms), bias resistor 207 (typically about 18 ohms), and n-channel control transistor 208 are the counterparts of comparable circuit elements in the prior-art FIG. 1 described above. However, the trigger circuit comprising the string of voltage-divider transistors and associated components introduces a hysteresis into the protective circuit operation as described below. The effect of the protective circuitry is to provide for protection of the operational circuitry 222 connected to the bondpads, and may also provide improved protection to still other circuitry indirectly coupled to the bondpads through the operational circuitry 222.

The voltage divider string comprises resistor 209 (typically about 30 kilohms) connected at first intermediate node 210 to a string of transistors 211–216. These voltage-divider transistors are p-channel field effect devices in the illustrative case, and have their sources connected to the doped semiconductor tub region in which they are formed by means of a tub-tie (not shown) in order to provide for improved stability of operation. However, the use of n-channel voltage-divider transistors is alternatively possible. A feedback transistor 217 has its gate connected to intermediate node 209, its source connected to the $V_{DD}$ conductor 202, and its drain connected to the gate of control transistor 218. In addition, the drain of transistor 217 connects to the gate of shorting transistor 218 and bias resistor 220 (typically about 30 kilohms). The shorting transistor 218 has its drain connected to second intermediate node 219 of the string, and its source connected to $V_{SS}$ conductor 203.

The operation of the feedback transistor and associated circuitry serves to produce a hysteresis in the operation of the protection circuitry as follows:

(1) When normal power supply operating voltages (e.g., $V_{DD}$=5 volts) are present, the first intermediate node 210 is maintained at approximately the same voltage as $V_{DD}$ conductor 202 by the pull-up action of resistor 209. The transistor string 211–216 is designed to be non-conducting at normal operating voltages, due to the threshold voltages and number of the transistors in the string. Therefore, the high gate voltage on p-channel transistor 217 prevents it from conducting, and so the gate voltage on n-channel control transistor 208 is maintained low by resistor 220. Therefore, control transistor 208 is maintained non-conducting, which allows the base voltage on protection transistor 205 to be held at a high level by resistor 206. The maintains protection transistor 205 non-conducting during normal circuit operation.

(2) When an excessively high voltage, as due to an ESD event, is present between power supply conductors 202 and 203, the source of feedback transistor 217 becomes positively biased with respect to the gate, since first intermediate node 210 is held at a relatively constant voltage by the clamping action of transistors 211–216 in the string. For example, if the string of transistors 211–216 starts to conduct at 8 volts, then first intermediate node 210 is clamped at about this value. Therefore, if the threshold of feedback transistor 217 is about 1 volt, then transistor 217 begins to conduct when the voltage difference between power supply conductors 202 and 203 exceeds 8+1=9 volts. The conduction of feedback transistor 217 pulls the voltage on the gate of control transistor 208 high, allowing it to conduct and thereby pull down the voltage on the base of protection transistor 205. This action allows protection transistor 205 to conduct the ESD current between conductors 202 and 203, thereby protecting other portions of the integrated circuit.

(3) The afore-mentioned conduction of feedback transistor 217 also pulls the gate of shorting transistor 218 high; this action allows the shorting transistor to conduct. In effect, this electrically removes transistor 216 from the string by pulling the voltage on second intermediate node 219 down to the voltage on power supply conductor 203. Therefore, by effectively removing the voltage drop of transistor 216 from the string, the voltage on the first intermediate node 210 is reduced by that amount; i.e., by 1.3 volts in the illustrative case. This reduction of voltage on node 210 serves to keep feedback transistor 217 conducting until the voltage difference between power supply conductors 202 and 203 is reduced to less than the voltage on node 210 plus the threshold of feedback transistor 217, or 6.7+1=7.7 volts in the illustrative case. When feedback transistor 217 returns to the non-conducting state after the ESD event, the control transistor 208, protection transistor 205, and shorting transistor 218 also return to the non-conducting state, as in (1) above.

Therefore, a hysteresis effect has been introduced, since the conduction of the protective transistor 205 commences when the voltage difference between conductors 202 and 203 exceeds 9 volts, and continues until this voltage difference is reduced to less than 7.7 volts, producing a hysteresis of 1.3 volts in the illustrative case. Note that this may be considered a direct current (DC) hysteresis, since it is independent of the speed that the voltage difference between conductors 202 and 203 changes. However, it has also been found desirable in the preferred embodiment to include a transient current that speeds up the turn-on of the protective transistor when a rapidly increasing ESD voltage is present. This is obtained by the use of optional speed-up capacitor 221 that allows transient current flow to rapidly pull the gate of control transistor 208 high during an ESD event, thereby more rapidly causing protective transistor 205 to conduct than would be the case without capacitor 221. I recommend that the speed-up capacitor have a value about equal to the gate capacitance of transistor 208. As compared to FIG. 1, the circuitry of FIG. 2 has been found to provide for improved ESD protection in a typical case, while still preventing a slight over-voltage on the bondpads from triggering the protective circuitry.

While the above embodiment gives typical design values suitable for an illustrative embodiment implemented in 0.9 micron CMOS technology, a wide range of transistor, resistor, and capacitor sizes is possible, depending on the protection needs required and available component values. The protection transistor may be a field effect type (e.g., p-channel) in lieu of the PNP bipolar transistor. In that case, the connection of the gate of the field effect protective transistor corresponds to the connection of the base of transistor 205, and the source and drain regions are connected between power supply conductors 202 and 203. The preferred protective transistor type typically depends on the gain of the devices available in a given fabrication process, along with other device parameters and susceptibility of the protection transistor itself to ESD damage. The speed-up capacitor may be implemented by a p-channel transistor as indicated in FIG. 2, or alternatively by an n-channel transistor, by a polysilicon/dielectric/polysilicon device, or any other suitable capacitor construction.

The shorting transistor may be used to bypass more than one transistor in the string, by connecting it to a higher node. For example, the drain of shoring transistor 218 may be connected to the connection between the drain of transistor 214 and the source of transistor 215 in lieu of node 219. By effectively removing more than one transistor (e.g., both 215 and 215) from the string, the hysteresis voltage is increased accordingly. Furthermore, while the above embodiment has shown the shoring transistor to be connected so as to remove transistors from the lower portion of the string, it may alternatively be connected so as to remove transistors at the top of the string (i.e., nearer to $V_{DD}$ conductor 202). It that case, it may be more desirable to use a p-channel device as the shoring transistor, in which case it conducts with a low gate voltage. A resistor may be serially connected to the bottom of the transistor string (i.e., connected to $V_{SS}$ conductor 203) for providing the first intermediate node, in lieu of, or in addition to, the resistor 209 shown connected to the top of the string. In lieu of field effect transistors in the string, the voltage dropping devices in the string may alternatively be bipolar transistors, diodes, or other devices that provide a relatively constant voltage drop independent of current flow through such device.

A variety of other modifications to the circuitry shown in FIG. 2 will be apparent to persons of skill in the art when implementing the present invention. Furthermore, while protection against positive ESD voltages appearing between the $V_{DD}$ and $V_{SS}$ bondpads is shown in FIG. 2, protection of other bondpads is possible. For example, the protective circuitry may be connected between an input/output (I/O) bondpad and $V_{SS}$ in order to obtain protection of circuitry connected to such I/O bondpad. This may be in addition to, or in lieu of, the protection of such circuitry already afforded by the connection between the power supply conductors shown in FIG. 2. The protection against negative ESD voltages may be provided in a comparable manner, with the opposite-polarity of transistors utilized as required in lieu of those illustrated in FIG. 2.

. I claim:

1. An integrated circuit comprising bondpads connected to circuitry, and having a protective transistor connected between two of said bondpads, and further comprising a string of voltage dropping devices connected between said bondpads and providing a first intermediate node coupled to the control electrode of said protective transistor for allowing the flow of current through said protective transistor when the voltage across said bondpads exceeds a first voltage level;

wherein said integrated circuit further comprises a shorting transistor that conducts so as to effectively remove at least one of the voltage dropping devices from the string when the voltage across said bondpads increases beyond a first voltage level, and said shorting transistor does not conduct when the voltage across said bondpads is reduced below a second voltage level that is less than said first voltage level.

2. The integrated circuit of claim 1 wherein said protective transistor is a PNP bipolar transistor.

3. The integrated circuit of claim 1 wherein said protective transistor is a p-channel field effect transistor.

4. The integrated circuit of claim 1 wherein the voltage dropping devices in said string are field effect transistors.

5. The integrated circuit of claim 1 wherein said shorting transistor is an n-channel field effect transistor having its source connected to a ground ($V_{SS}$) power supply conductor and its drain connected to a second intermediate node of said string.

6. The integrated circuit of claim 1 further comprising a capacitor coupled between one of said bondpads and said protective transistor so as to speed up the onset of conduction of said protective transistor when an ESD voltage appears on said bondpad.

7. An integrated circuit comprising a positive voltage power supply ($V_{DD}$) conductor and a ground voltage power supply ($V_{SS}$) conductor connected to operational circuitry, and having a protective transistor connected between said power supply conductors, and further having a control transistor having controlled electrodes coupled between the control electrode of said protective transistor and a given one of said power supply conductors;

and further comprising a string of voltage dropping transistors connected between a given one of said power supply conductors and a first intermediate node, and a resistor connected between said first intermediate node and the other one of said power supply conductors;

and further comprising a feedback transistor having a control electrode coupled to said first intermediate node and having a first controlled electrode coupled to one of said power supply conductors and having a second controlled electrode coupled to the control electrode of said control transistor;

and still further comprising a shorting transistor having: a first controlled electrode connected to a second intermediate node where one of said transistors in the string is connected to another one of said transistors in the string, and having a second controlled electrode connected to one of said power supply conductors, and also having a control electrode coupled to the second controlled electrode of said feedback transistor;

whereby said protective transistor conducts when the voltage across said power supply conductors increases beyond a first voltage level, and does not conduct when the voltage across said power supply conductors is reduced below a second voltage level that is less than said first voltage level.

8. The integrated circuit of claim 7 further comprising a capacitor coupled between one of said power supply conductors and the control electrode of said control transistor so as to speed up the onset of conduction of said protective transistor when an ESD voltage appears on said one of said power supply conductors.

9. The integrated circuit of claim 7 wherein said protective transistor is a PNP bipolar transistor.

10. The integrated circuit of claim 7 wherein said protective transistor is a p-channel field effect transistor.

11. The integrated circuit of claim 7 wherein the voltage dropping transistors in said string are p-channel field effect transistors.

12. The integrated circuit of claim 7 wherein said shorting transistor is an n-channel field effect transistor having its source connected to the ground power supply ($V_{SS}$) conductor.

* * * * *